United States Patent [19]

Isozaki et al.

[11] Patent Number: 4,622,601
[45] Date of Patent: Nov. 11, 1986

[54] FLEXIBLE DISC DEVICE FOR MEDIA OF DIFFERENT TRACK DENSITIES

[75] Inventors: Shin Isozaki; Masaru Sasaki; Shuroku Hosaka, all of Kanagawa, Japan

[73] Assignee: Mitsubishi Denki Kabushiki Kaisha, Tokyo, Japan

[21] Appl. No.: 537,439

[22] Filed: Sep. 30, 1983

[30] Foreign Application Priority Data

Oct. 1, 1982 [JP] Japan .............................. 57-173066
Oct. 1, 1982 [JP] Japan .............................. 57-173067

[51] Int. Cl.[4] ...................... G11B 5/09; G11B 5/127; G11B 21/08
[52] U.S. Cl. ..................................... 360/48; 360/78; 360/118
[58] Field of Search ................... 360/121, 118, 75, 48, 360/66, 78

[56] References Cited

U.S. PATENT DOCUMENTS

| | | | |
|---|---|---|---|
| 3,155,949 | 11/1964 | Tibbetts | 360/121 |
| 4,159,493 | 6/1979 | Ohta et al. | 360/121 |
| 4,298,897 | 11/1981 | Arter et al. | 360/48 |
| 4,371,901 | 2/1983 | Shah | 360/65 |
| 4,405,959 | 9/1983 | Chabrolle | 360/121 |

Primary Examiner—Vincent P. Canney
Attorney, Agent, or Firm—Bernard, Rothwell & Brown

[57] ABSTRACT

In a flexible disc device having a magnetic head for reading data written in a flexible disc medium or writing data to the medium, the magnetic head enables to change effective track width specified by core width of writing/reading head gap and erasing head gap at the writing state corresponding to the record density in the diameter direction of the disc medium, thereby compatibility is obtained between plural sorts of flexible disc media being different in the track density.

11 Claims, 15 Drawing Figures

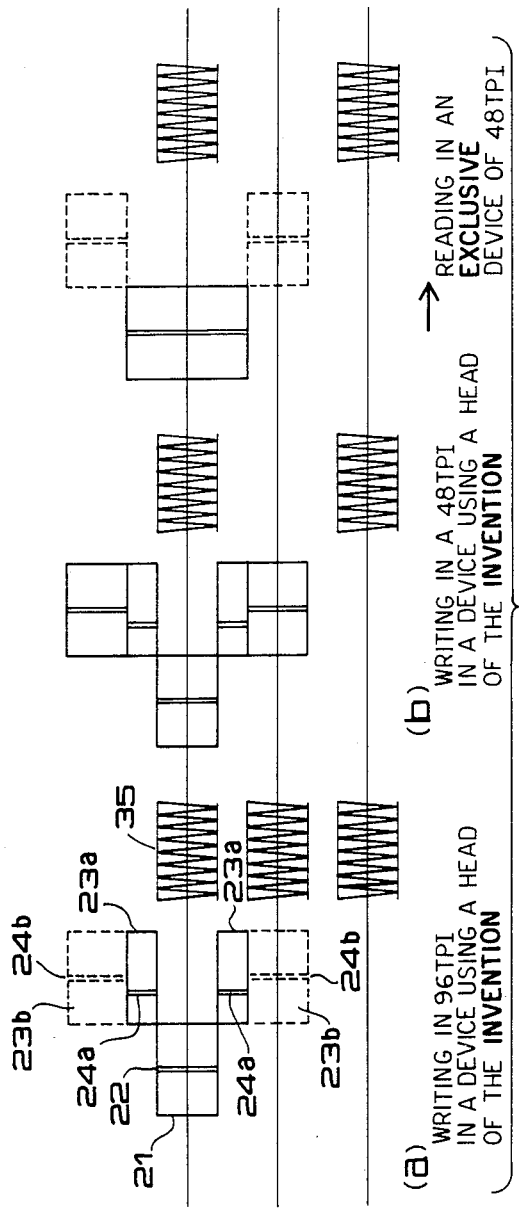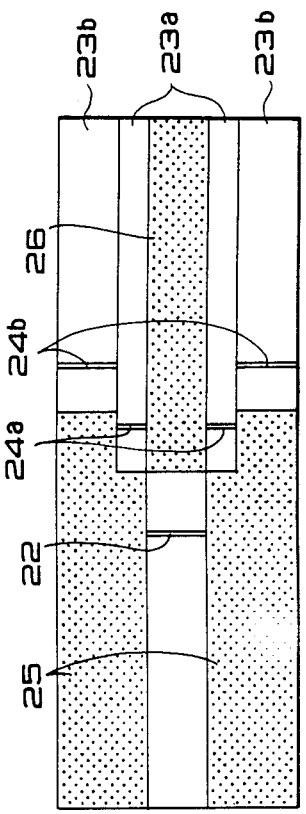

FLEXIBLE DISC DEVICE FOR MEDIA OF DIFFERENT TRACK DENSITIES

BACKGROUND OF THE INVENTION

1. Field of the Invention

This invention relates to flexible disc devices for storing information, and more particularly to systems for securing compatibility between memory media of different track density and to a magnet head assembly suitable for use in the system.

2. Description of the Prior Art

In recent years, there has been remarkable development in magnetic recording technology, and recording density of information devices such as a magnetic disc device or a flexible disc device has been improved significantly.

In order to realize the high recording density, the line recording density per track and also the track density have been raised. In a flexible disc device of the exchangeable medium type used as a file, the track density has also been rapidly improved. Although 48 tracks per inch (hereinafter referred to as TPI) were usually used in small devices in the prior art, there has been increasing use of 96 TPI recently and this use is increasing further.

This increasing use of 96 TPI has created a problem. Change in the track density results in change of the device as a whole, and since it is difficult for a medium recorded in a new device of 96 TPI to be reproduced or recorded in conventional device of 48 TPI, the medium must be used only in the original device in the present practice. Accordingly, if media recorded in devices of 48 TPI and 96 TPI can be mutually recorded and reproduced, there will be substantial economic benefit.

Prior art relating to a flexible disc device of high density will now be described.

In order to realize a flexible disc of high density, one conventional device distinguishes difference in the coercive force of the recording medium or the magnetic property of the coated film thickness. In such a device, a notch is provided at a specific position of a jacket so as to prevent the data error which would occur by the use of high-density medium in a conventional device or inversely the use of ordinary medium in a high-density device and to detect the mistake in use. The device is so constituted that a medium discrimination detector A informs an operator of mistake a in setting a flexible disc, and the information is transmitted through a medium setting error detecting circuit B and a signal connector to a host computer C as shown in FIG. 1. In a series of operations, information concerning the mistake is provided to the operator and the host computer C so as to inhibit incorrect writing or reading action.

In addition, FIG. 1 shows many circuits and elements without reference numerals. Since the basic function of these elements is known by those skilled in the art and the elements do not relate directly to this invention, description of these elements is omitted at this point and will be supplied when required in the course of this disclosure.

Another device of 96 TPI can be used for both a high density medium and an ordinary medium. In such a device, use of an inside track having a high line recording density is inhibited when using an ordinary medium and the writing current is changed corresponding to the difference in the properties of the medium.

However, such discrimination signal is not used for changing the track density in the prior art. FIG. 1 shows a conventional example particularly utilizing the high density medium, except that devices commonly used in the prior art had no medium discrimination detector.

Regarding the compatibility between devices or media which are different in track width, information of 48 TPI written in the same medium property, i.e. the same line recording density, can be read by a device of 96 TPI in prior art. This is because the center portion of a track in 48 TPI is made coincident with that of a track of even number in 96 TPI.

On the contrary, information written in a device of 96 TPI cannot be read by a device of 48 TPI in the prior art. If information is written only in tracks of even number in 96 TPI, the effective width of the information track becomes ½ but appreciable trouble does not occur. However, various noise such as old information in the track position of the odd number tracks is read by the wide head of 48 TPI in this state, and the disturbing noise decreases the signal-to-noise ratio.

Accordingly, in the prior art, a disc recorded in a device of 48 TPI can be read by a device of 96 TPI; a disc recorded in 96 TPI cannot be read by a device of 48 TPI. That is, the compatibility of mutual medium writing does not exist in the full sense.

SUMMARY OF THE INVENTION

In order to eliminate the above-mentioned disadvantages of conventional flexible disc devices, this invention provides a system such as a small computer wherein a large amount of software stored in a large number of discs prepared by an ordinary flexible disc device remains intact and can be successively read and written again for use in a new system.

This invention provides an approach to rewriting an ordinary disc of 48 TPI in a new large-capacity device of 96 TPI so that it can be read also in a conventional device of 48 TPI. For example, this invention proposes the following requirements:

Firstly, the invention utilizes a new magnetic head having the bidirectional compatibility wherein information recorded in 48 TPI, for example, can be read in 96 TPI and information recorded in 96 TPI can be read by a conventional device of 48 TPI.

Secondly, the invention includes means for discriminating the recording track density of a flexible disc in use. This means may be installed at the inside of the device corresponding to the shape of a jacket or otherwise at the outside of the device so that the detection is performed using software in a host computer corresponding to the read information.

Thirdly, this invention contains means for changing the effective recording track width of the magnetic head electrically during rewriting on the disc corresponding to the track density signal discriminated as above described. The effective recording track width includes the erase band width usually used in a flexible disc device.

Fourthly, the track density signal discriminated as above described is transmitted to the host computer by any method and used to change over the track number usable by the host computer. The changing over is unnecessary when the track density is detected using software at the host side.

Although the requirements of the invention are satisfied by the above mentioned items, the following objects may be added, if necessary.

Fifthly, the invention may include means for changing the shift amount of the head positioning by the track density discriminating signal in the drive corresponding to the discriminated TPI.

Sixthly, the recording current or electric property of the reading circuit can be changed in accordance with the track density discriminating signal as above described. This is required particularly when the line record density is different between a large-capacity medium and a ordinary medium or when the magnetic property is different between media.

Seventhly, the transfer frequency of a controller for a host controller or the like and the center frequency of the synchronous circuit of the data demodulation circuit may be changed with the above-mentioned track density discriminating signal when a disc with a different track density differs also in data transfer frequency caused by the difference of the record density.

Eighthly, the rotating speed of the disc can be altered according to the above-mentioned track density discriminating signal. Thereby discs which differ in the line recording density can be recorded and regenerated in the same transfer frequency, and the optimum rotating speed can be selected for the respective discs.

Still another object of the invention is to provide a magnetic head assembly which is suitable for attaining the above-mentioned objects.

A magnetic head assembly of the invention comprises means for varying the effective width erased on the magnetic recording medium. As an example of specific means, two pairs of erasing head gaps are provided at both sides of the writing/reading head cores of effective erase width. Only one pair of gaps at the inside are energized when one medium is employed and both of the pairs are energized when the other medium is employed.

BRIEF DESCRIPTION OF THE DRAWINGS

FIG. 9(a) is a diagram illustrating the record regenerative state of a magnetic head assembly in an embodiment of the invention when the head assembly is used for 96 TPI;

FIG. 9(b) is a similar diagram illustrating the record regenerative state of the magnetic head assembly when the head assembly is used for 48 TPI;

FIG. 10 is a plan view of the core portion in a magnetic head assembly in another embodiment of the invention;

DETAILED DESCRIPTION OF THE PREFERRED EMBODIMENTS

Figure 1:
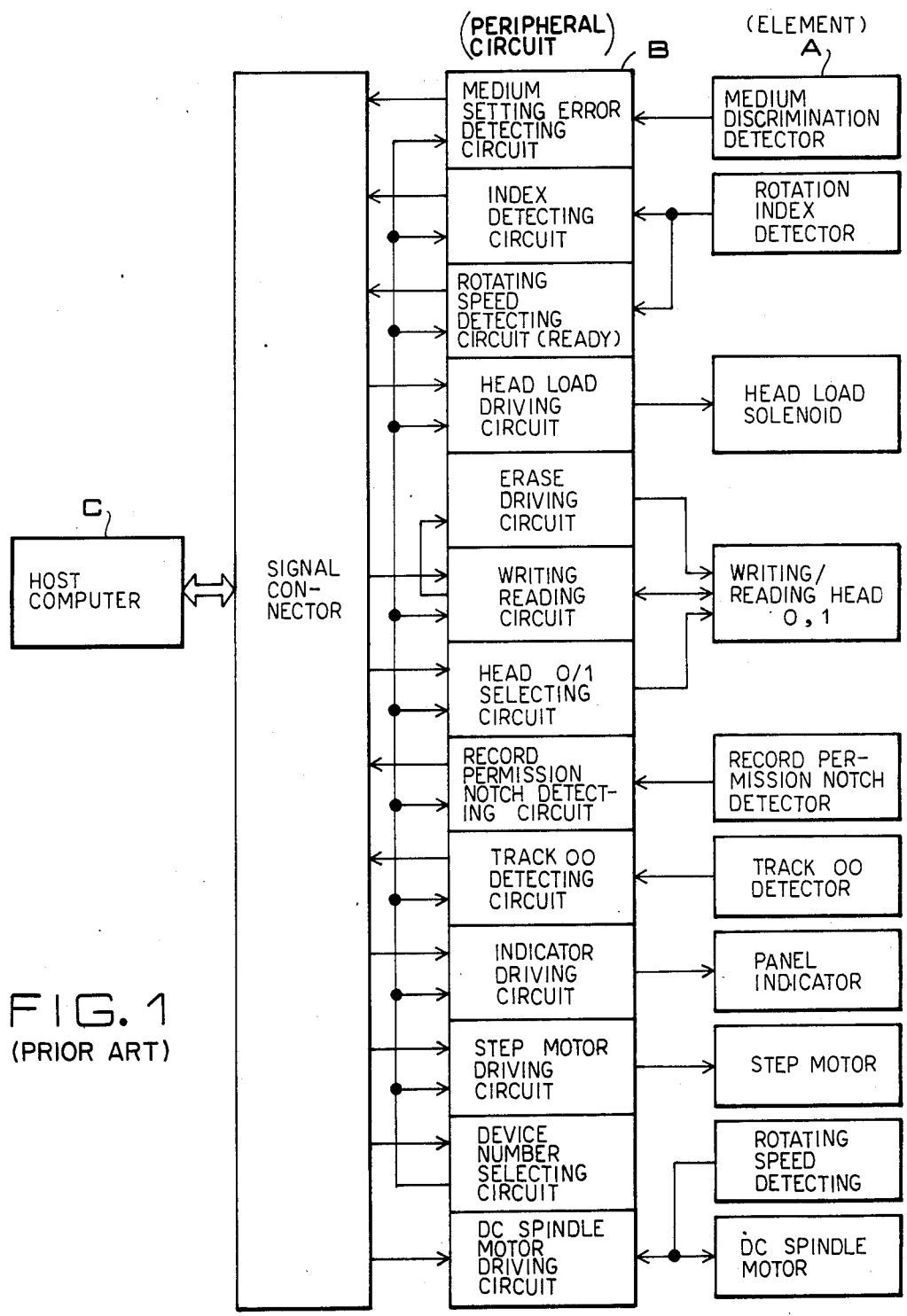
FIG. 1, consisting of A-C, is a block diagram of a prior art system including a flexible disc device.
Figure 2:
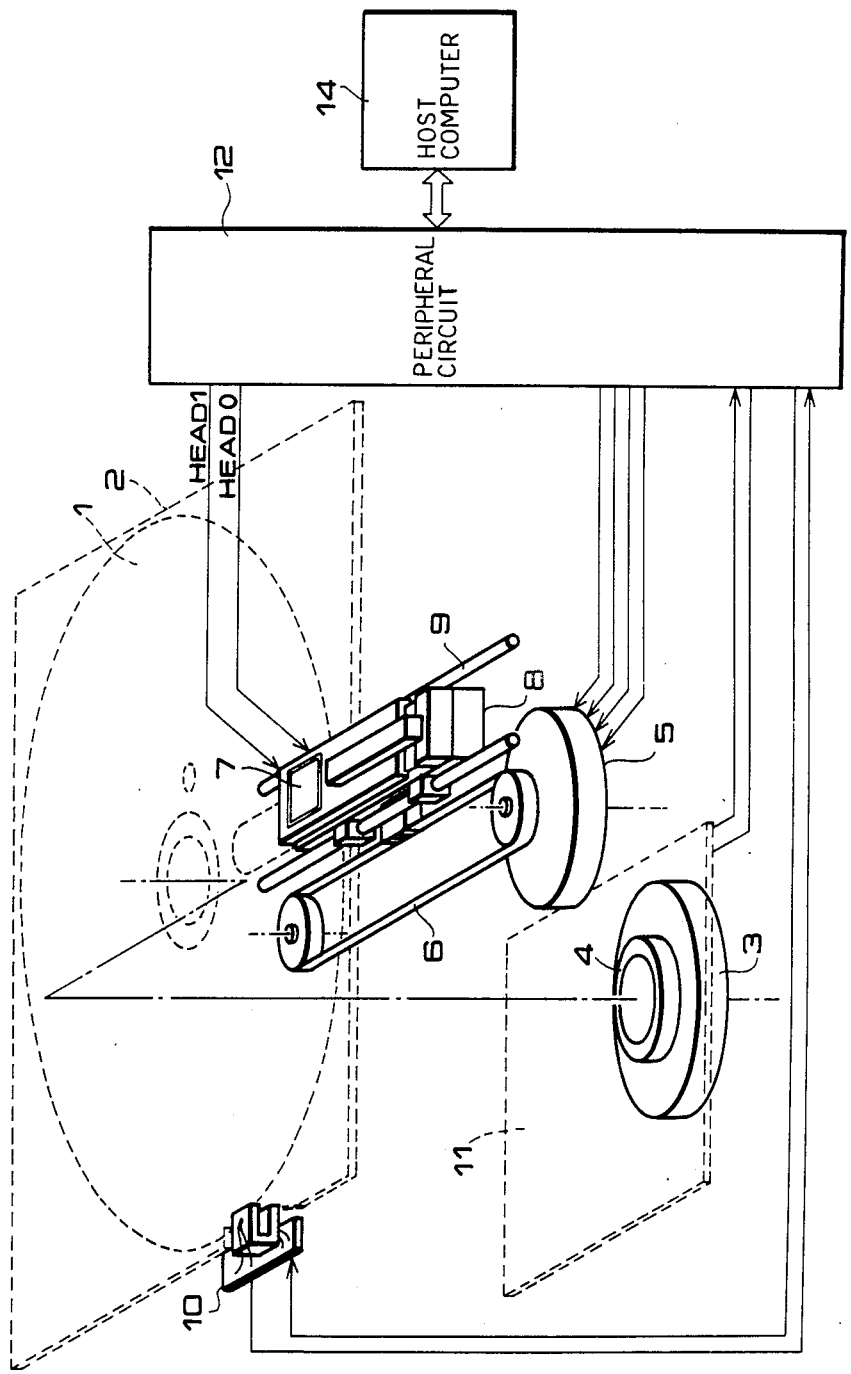
FIG. 2 is a system diagram including a schematic view of a flexible disc device of the invention.

A flexible disc device as an embodiment of the present invention is a magnetic record information memory of the rotary type which is compact and convenient in shown in a schematic view of FIG. 2. A storage medium of the device is an exchangeable flexible disc cartridge, that is, a disc 1 which is formed by applying magnetic recording medium to a plastic film of polyester and enclosing the disk in a rectangular jacket 2.

The flexible disc 1 within the jacket is rotated by a motor 3 and a spindle 4 at a constant speed specified corresponding to the disc 1 in use.

A magnetic head 7 is of the one-surface type. In operation, the magnetic head 7 is in contact with the disc 1. A carriage 8 to hold the head 7 is moved on guide rods 9 in the direction of the disc diameter. Positioning of the head is performed by a step motor 5 through a steel belt mechanism 6 such as shown in FIG. 2.

Figure 3:
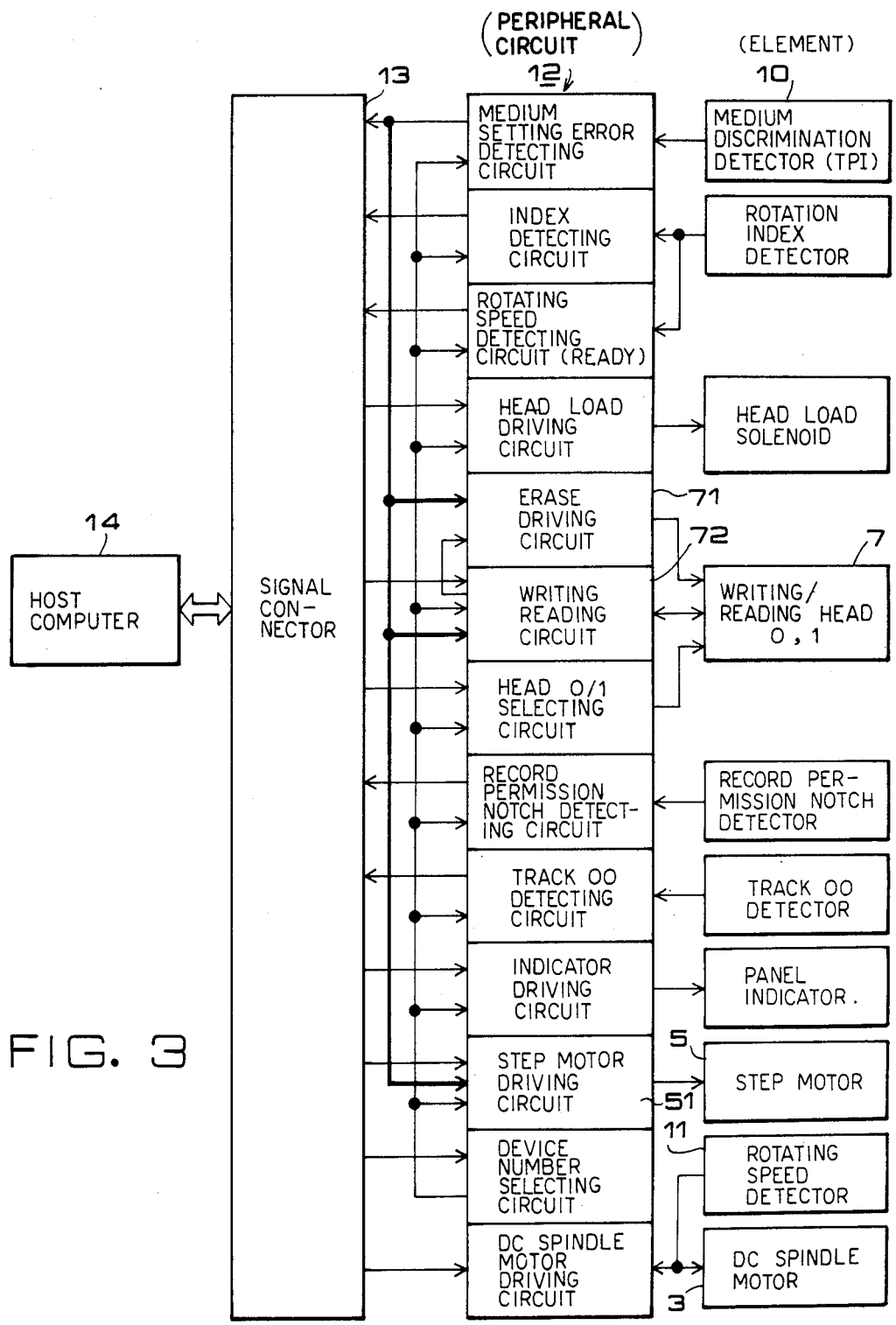
FIG. 3 is a block diagram of a system including a flexible disc device as an embodiment of the invention.

In FIG. 2, reference numeral 10 designates a medium discrimination detector utilizing a detector employed in the prior art for indicating the medium being used. The function of the medium discrimination detector 10 in the prior art and in the invention will be described later. Numeral 11 designates a rotating speed detector for the DC spindle motor 3. Numeral 12 designates a peripheral circuit for receiving and sending data and control signals and processing them between the above mentioned DC spindle motor 3, step motor 5, head 7, medium discrimination detector 10 and rotating speed detector 11. The peripheral circuit 12 includes various circuits as shown in FIG. 3. Numeral 14 designates a host computer, which could be a personal computer known in the prior art, such as IBM 5150 type, Apple III, or PC-8001 of Nippon Electric Co. Detailed description of the host computer 14 will be omitted.

An embodiment of the invention will now be described.

FIG. 3 shows a block diagram of a flexible disc device according to the invention, in which the same reference numerals as those in FIG. 2 denote the same or like parts.

The medium discrimination detector 10 distinguishes the shape of the flexible disc 2 shown in FIG. 2, i.e. a notch or a hole using an optical sensor. A disc having a notch represents a new type of high density record e.g. a disc of 96 TPI. This detection can be also performed using a microswitch or the like.

An electric signal which is detected by the detector 10 and discriminated by the medium discrimination circuit 12 for representing the high track density is transmitted through a signal connector 13 to a disc controller in the computer. The electric signal is also supplied to an erasing head current drive circuit 71, a writing/reading circit 72 and a step motor drive circuit 51 as shown in thick solid lines in FIG. 3.

Figure 4:
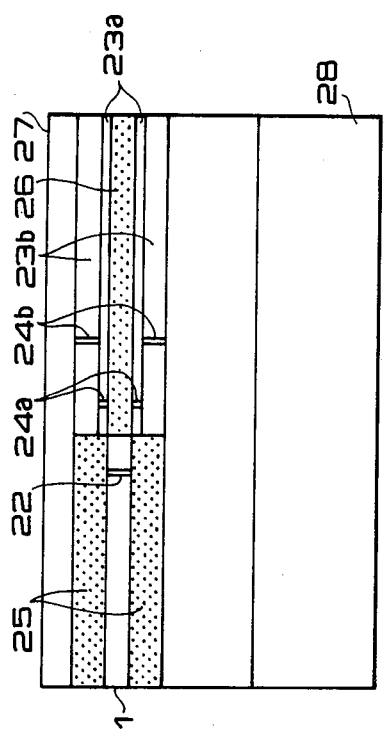
FIG. 4 is a plan view of a medium sliding surface of a head assembly for a flexible disc device in the prior art.
Figure 5:
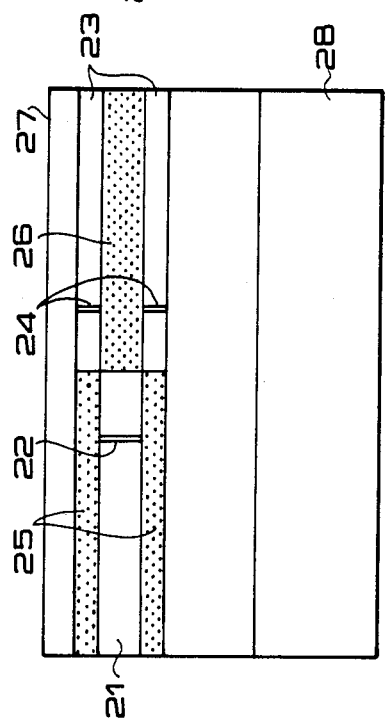
FIG. 5 is a plan view of magnetic gap arrangement of a magnetic head sliding surface for a flexible disc device in an embodiment of the invention.

A magnetic head 7 used in a conventional device has the magnetic pole structure as shown in FIG. 4, but that used in an embodiment of the invention has the pole structure as shown in FIG. 5. In FIGS. 4 and 5, numeral 21 designates a writing/reading head core, numeral 22 a writing/reading gap, numeral 23 an erasing head core, and numeral 24 an erasing gap. In the head of the invention as shown in FIG. 5, the erasing head gaps are halved into 24a, 24b. In addition, numerals 25, 26 designate non-magnetic spacers, and numerals 27, 28 designate slide shoes.

Figure 6:
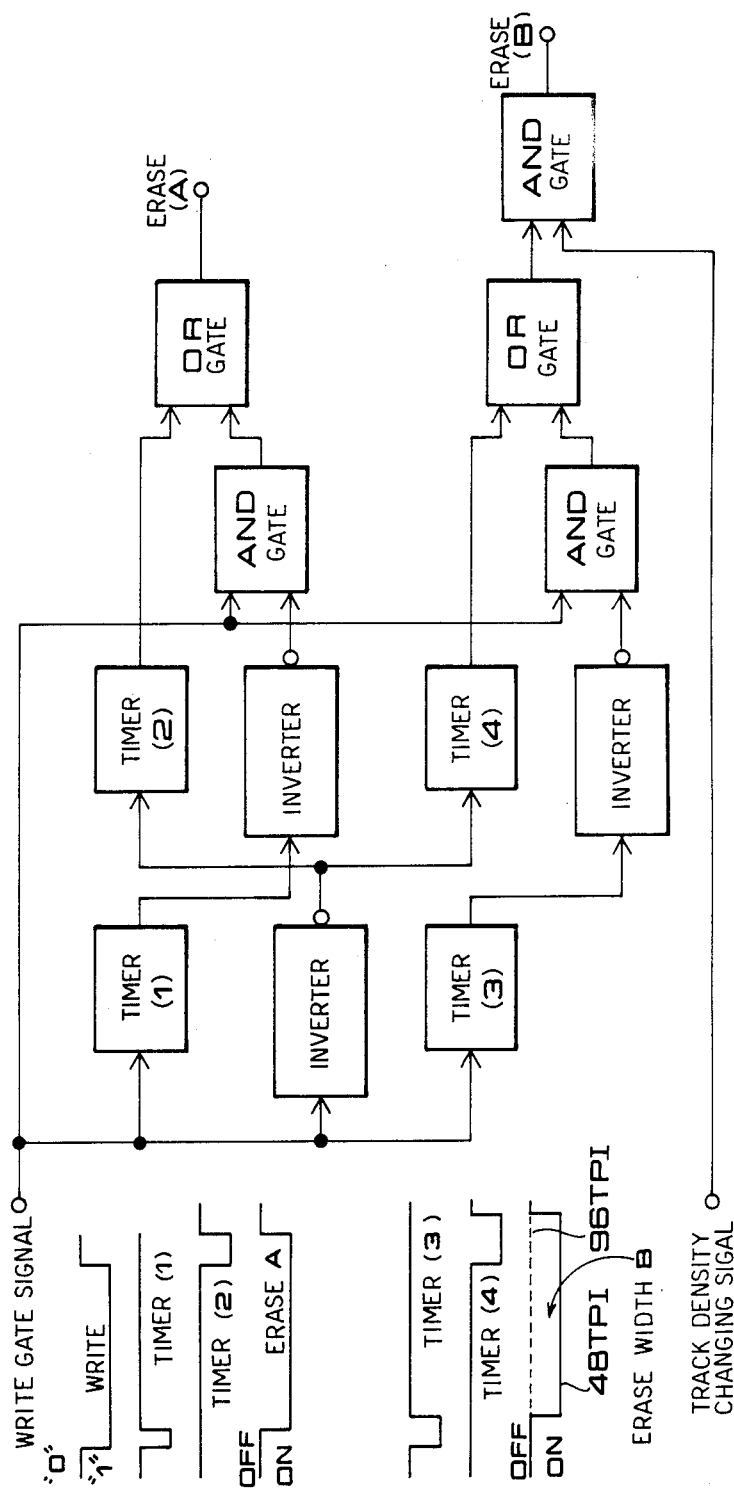
FIG. 6 is a diagram illustrating an erasing head drive circuit in an embodiment of the invention.

The erasing head drive circuit 71 is constituted as shown in FIG. 6. For example, if the track density changing signal is made a "1" signal at 48 TPI, current flows through both erase A and erase B in the recording state and the erasing gaps 24a and 24b are energized; thereby the old signal is erased throughout a wide region corresponding to 48 TPI.

When the track density changing signal shows 96 TPI, gating is effected so that current corresponding to erase B does not flow, and only gap 24a, corresponding to erase A, is energized in the recording state, whereby a narrow region, corresponding to 96 TPI, is erased.

A new recording signal is written at the writing/reading gap 22 and becomes the optimum width for 96 TPI. Therefore, if recording of 48 TPI is effected in this state, the width becomes about half in comparison to the writing state using an ordinary device of 48 TPI. If the signal is read by an ordinary device of 48 TPI, the signal output becomes about half. However, since the disc of a device of 48 TPI is erased over a wide area by the above-mentioned erasing gaps 24a, 24b, a noise component is not regenerated in the wide head 21, reduction of the signal-to-noise ratio is about one half and no problem such as that with an ordinary device of 48 TPI occurs. The track written without energizing the gap 24b produces no problem as long as it is read by a new head. However, if the track is read by the wide head of 48 TPI, the old signal remaining without erase at both sides is superposed as a noise component; thereby the signal-to-noise ratio is significantly reduced and the reading becomes difficult.

The circuit of FIG. 6 includes timers 1, 2, 3 and 4 as an erasing current delay circuit to compensate for the distance between the record regenerative gap and the erase gap. These timers are not relevant to performance of the invention and description is omitted.

As above described, if the heads in FIG. 5 and the circuits in FIG. 6 are combined, information recorded in a new device of 96 TPI can be reproduced by a conventional device of 48 TPI without producing any problem.

When the heads in FIG. 5 are used with a device of 96 TPI, the width of the writing/reading gap 22 and the width of the erase gap 24a are optimized to the track density of 96 TPI, thereby avoiding any problem. With a disc having a conventional track density reading width of 48 TPI the head is disposed at about the center of the recording width of the tracks; if then the writing/reading gap 22 of the head of FIG. 5 is disposed at the tracks of even number of 96 TPI, stable reading is possible without mixing another signal.

The writing/reading circuit 72 does not produce an appreciable problem even when the track density is changed. In this embodiment, when changing state to the high track density the line recording density is doubled by using a special medium of high density. In this constitution, the recording current becomes suitable to the high-density medium and the data transfer frequency is doubled as the recording density increases; thereby the band width of the regenerative circuit is also changed.

If the host computer system 14 produces a feed signal for 48 TPI at a feed pitch twice the 96 TPI in accordance with that for discrimination signal of high track density medium, the step motor drive circuit 51 has only to work as in the case of 96 TPI. However, if control by the host computer 14 is required in the same procedure as a conventional device for 48 TPI, this embodiment can feed the step motor 5 by two pulses per one pulse of the track feed.

Figure 7:
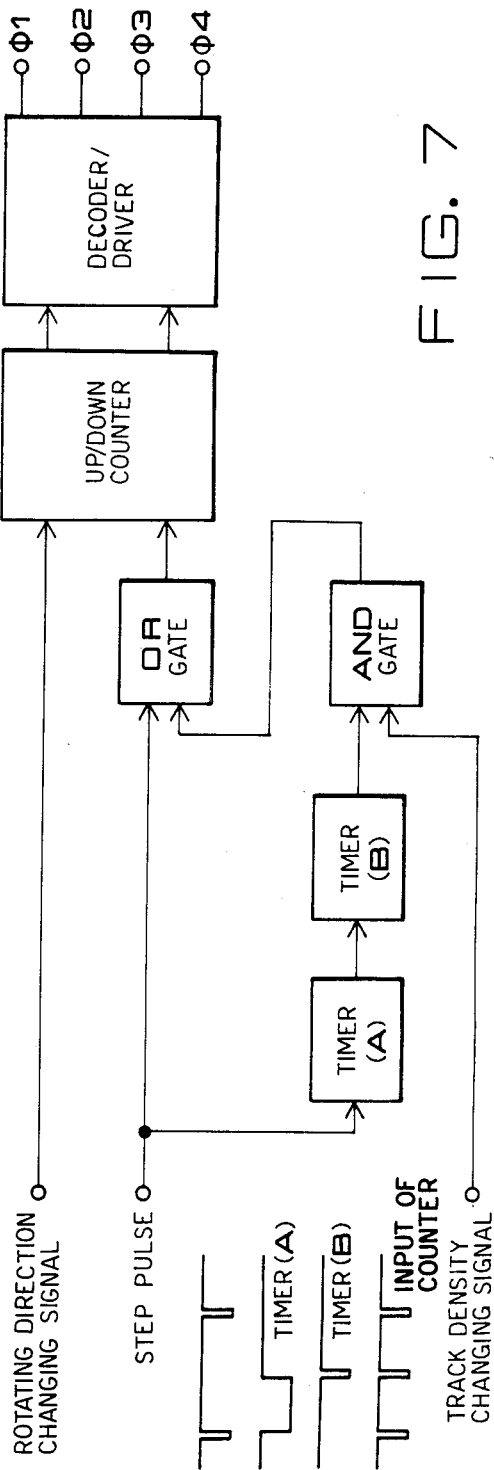
FIG. 7 is a diagram illustrating the condition of a step motor drive circuit in an embodiment of the invention.

In the circuit constitution as shown in FIG. 7, for an input of one step pulse the up/down counter if 48 TPI is detected, is counted twice; thus the step motor 5 is driven by two steps. If the device is reset initially to 00 track, it stops only at the even track position in 96 TPI and therefore coincides with nearly the center of the recording tracks of a conventional disc of 48 TPI.

Another embodiment of the invention will be described. Although the track density is optically detected by the jacket shape in the above description, the record content may be read at 96 TPI after inserting the disc, and the discrimintion is performed as 96 TPI when data can be properly read at all tracks and as 48 TPI when data can be read at even tracks and not read at odd tracks. If the line recording medium is different, the discrimination is performed as 96 TPI when data can be read at the high density and as 48 TPI when data can be read at conventional density. Record regeneration, track feed or the like can be maintained at the discrimination density until the disc is changed.

Although the description was made only of 96 TPI and 48 TPI in the above embodiment, the same principle holds between track densities in integral multiples, for example, between 144 TPI and 48 TPI. In this case, data can be properly read at one track per three tracks and the bidirectional compatibility of written data can be obtained by erasing at a wide region.

A further embodiment of the invention is realized by means for changing the disc rotating speed by the track density discrimination signal when both the track density and the line recording density are changed, for example, a device for varying the stable rotating speed of a direct drive type DC servomotor by changing a potential divider of reference voltage so as to raise the line recording density without varying the transfer frequency.

According to an embodiment of the invention as above described, a magnetic head having a variable erase width is used, the erase width corresponding to an inserted disc is varied with changes in the erase drive circuit, and bidirectional data compatibility in writing and reading in a recording system employing track widths of two types or more is secured by changing necessary circuits. Accordingly, the invention has no advantage that a large amount of software stored on the flexible disc by an old computer system remains in a new flexible disc device to constitute a new computer system of large capacity.

Detailed construction of a magnetic head assembly most suitable for the above-mentioned flexible disc device will now be described with reference to FIGS. 8–11.

The magnetic head assembly in the prior art and an embodiment of the invention, already described briefly referring to FIGS. 4 and 5, will be further described in comparison to a conventional structure.

In FIG. 4, which shows the conventional structure, the erasing head core 23 has the erasing gap 24 disposed on both sides of the record regenerative head core. In order to prevent the writing/reading gap 22 from receiving the noise component caused by a shift of track position, the erasing gap 24 serves to energize the erasing head core 23 and erase the record track side surface uniformly so as to erase noise at the peripheral portion of the record data. The non-magnetic spacers 25, 26 constitute a medium sliding surface. The slide shoes 27, 28 hold the head cores 21, 23 and the non-magnetic spacers 25, 26.

In order to improve the track density, the positioning mechanism such as the stepping motor for positioning the head assembly relative to the medium is arranged at a fine positioning pitch and at the same time the track width of the record writing/reading head core 21 and the erasing head core 23 in the head assembly is reduced. That is, if the track density is doubled, the track width of the writing/reading head core 21 and the erasing head core 23 will be nearly halved. These head assemblies are used individually for the respective flexible disc devices.

Regarding the compatibility between devices or media which are different in track width, in the prior art, information of 48 TPI written in the same medium property, i.e. the same line recording density, can be read by a device of 96 TPI. This is because the center position of a track of 48 TPI coincides with the center position of a track of even number of 96 TPI.

On the contrary, information recorded in a device of 96 TPI cannot be regenerated by a device of 48 TPI in the prior art. If information is written only in a track of even number in 96 TPI, the effective width of the information track becomes ½ without appreciable trouble. However, various noise such as old information in track positions of odd number is read only of a wide head of the 48 TPI type, and the disturbing noise decreases the signal-to-noise ratio.

The head assembly for a flexible disc device as an embodiment of the invention already described briefly will be hereinafter described further in detail referring to FIG. 5, which shows a plan view of the medium sliding surface of the head assembly and FIG. 8, which shows a perspective view of the core assembly portion of the head assembly.

This embodiment realizes the writing and reading in track densities of 48 TPI and 96 TPI in one head assembly. The head assembly comprises the writing/reading head core 21 set to the track width for 96 TPI, a pair of erasing head cores 23a, 23a energized at the recording state of 96 TPI and 48 TPI, and a pair of erasing gaps 24a, 24a therefor. A pair of erasing head cores 23b, 23b are energized only at recording state of 48 TPI, and have a pair of erasing gaps 24b, 24b. The erasing head cores 23b, 23b are disposed outside the erasing head cores 23a, 23a as shown in FIG. 5.

Figure 8:
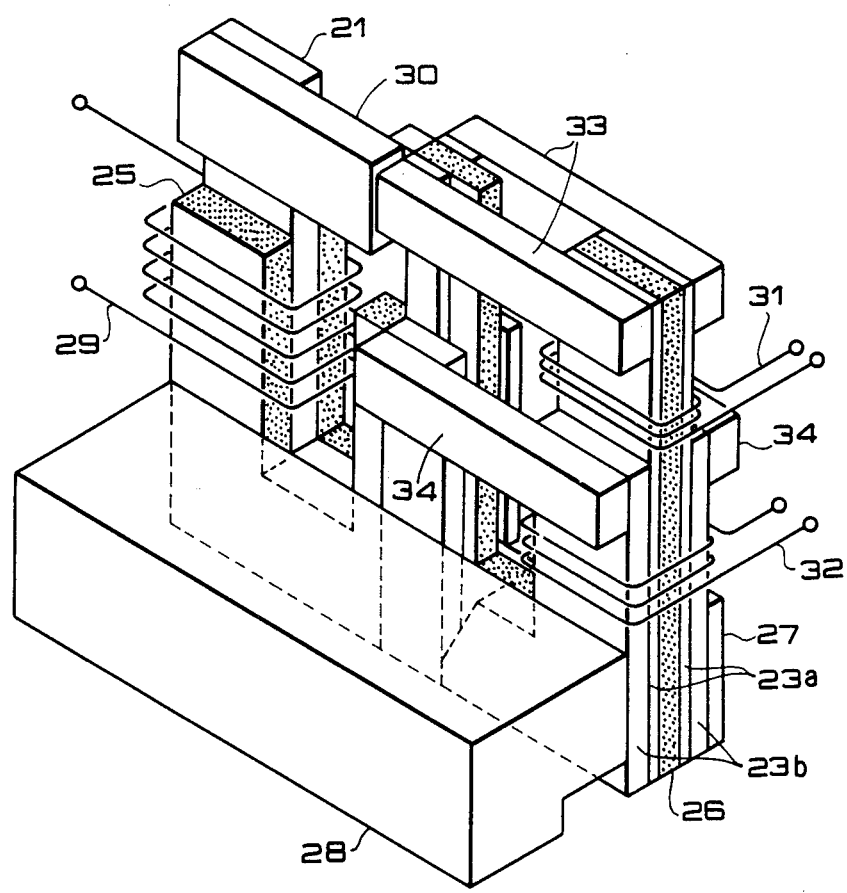
FIG. 8 is a perspective view of the core assembly portion of the magnetic head assembly in FIG. 5.

In FIG. 8, the writing/reading head core 21 is provided with a coil 29 and a closing core 30 adhered thereto. In a similar manner, a pair of head cores 23a, 23a are provided with an erasing coil 31 and a pair of closing cores 33, 33 adhered thereto, and a pair of the erasing head cores 23b, 23b are provided with an erasing coil 32 and a pair of closing cores 34 adhered thereto; thus the respective magnetic circuits are constituted.

The head assembly is moved and positioned in the direction of disc diameter by the stepping motor as a track positioning mechanism.

FIG. 9 is a diagram illustrating the writing/reading state of the head assembly in an embodiment of the invention. Since the density of the record data signal 35 is high at the writing state as shown in FIG. 9(a), when the head assembly is used for 96 TPI, only the pair of erasing head cores 23a, 23a are operated. The pair of erasing head cores 23b, 23b outside the track are not energized in order to prevent the erasing head from erasing the adjacent data signal.

When the head assembly as an embodiment of the invention is used for 48 TPI, two pairs of erasing head cores 23a, 23a, 23b, 23b are simultaneously energized in the writing state. Writing is accomplished by the writing/reading head core 1 as shown in FIG. 9(b). If the information thus recorded is read out by a device exclusively for 48 TPI, the output signal is decreased because of the narrowed track width in comparison to the data signal recorded by the device exclusively for 48 TPI. But the output signal is sufficient as long as it is over a definite value. Moreover, when the recording is effected for 48 TPI using the head assembly of an embodiment of the invention, since the disc contacting with the wide reading head of the device exclusively for 48 TPI is widely erased by the head cores 23a, 23a, 23b, 23b, the noise component is not reproduced in the wide reading head and signal-to-noise ratio is reduced by about a half thereby being in a region which does not produce any problem.

Figure 11:
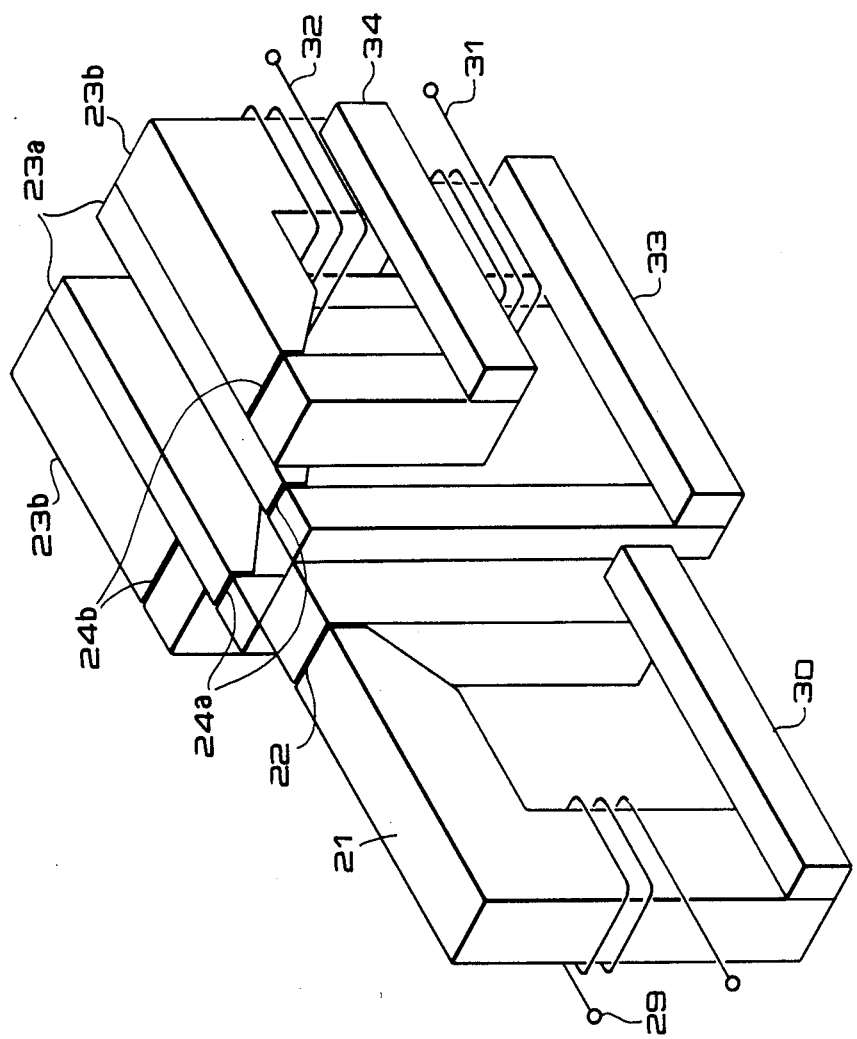
FIG. 11 is a perspective view of the core assembly portion of the magnetic head assembly in FIG. 10.

FIG. 10 is a view showing only the head core portion of another embodiment of the invention, and FIG. 11 is a perspective view of the core portion of FIG. 10. In both figures, like reference characters of FIG. 5 and FIG. 8 denote the same or like parts.

When a device for 96 TPI is used to energize only a pair of erasing head cores 23a, 23a, magnetic flux may flow also to a pair of erasing head cores 23b, 23b and a strong magnetic field is generated in a pair of erasing gaps 24b, 24b and data in the track adjacent to 96 TPI is erased. This embodiment prevents such a situation. The erasing head cores 23b, 23b outside the gaps 24b, 24b are separated from the writing/reading head core 21 so that the gaps 24a, 24a, 24b, 24b of two pairs of the erasing head cores 23a, 23a, 23b, 23b are not aligned. Thereby magnetic reluctance of the gaps 24b, 24b of the outer erasing head cores 23b, 23b with respect to the external magnetic field is made relatively large.

According to the embodiments of the present invention as above described, the medium can be used with devices of different track density by changing the erasing heads of the head assembly, and a device of high track density and a conventional device of low track density may be used in combination, thereby achieving a large economical effect.

The spirit of the present invention can be clearly understood from the above description by those skilled in the art. For the purpose of better understanding, however, additional explanation will be hereinafter carried out regarding a notch or a hole of a flexible disc jacket, means for detecting the notch or the hole optically or mechanically, and means for discriminating the track density of the flexible disc medium in the direction of diameter utilizing a host computer, all being known as the prior art.

Figure 12A:
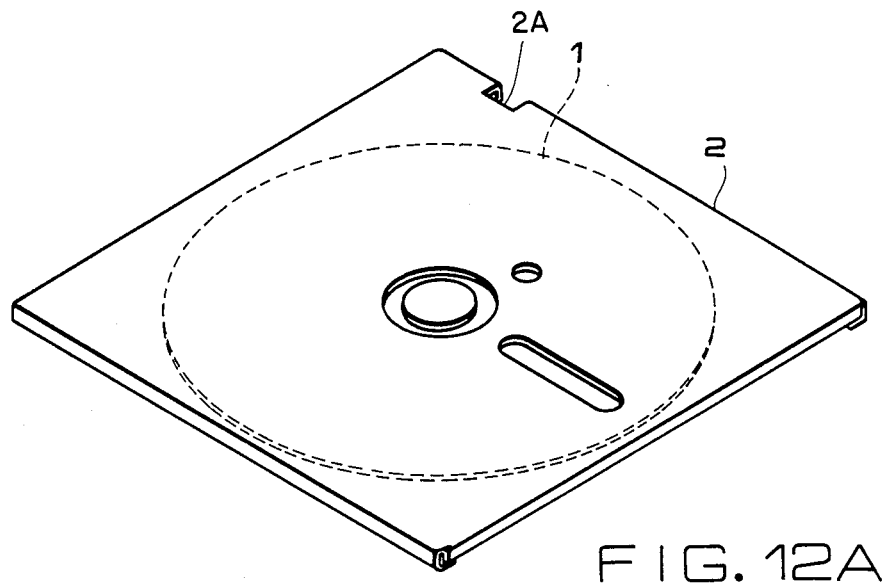
FIG. 12A is a perspective view of a prior art jacket including a flexible disc medium.
Figure 12B:
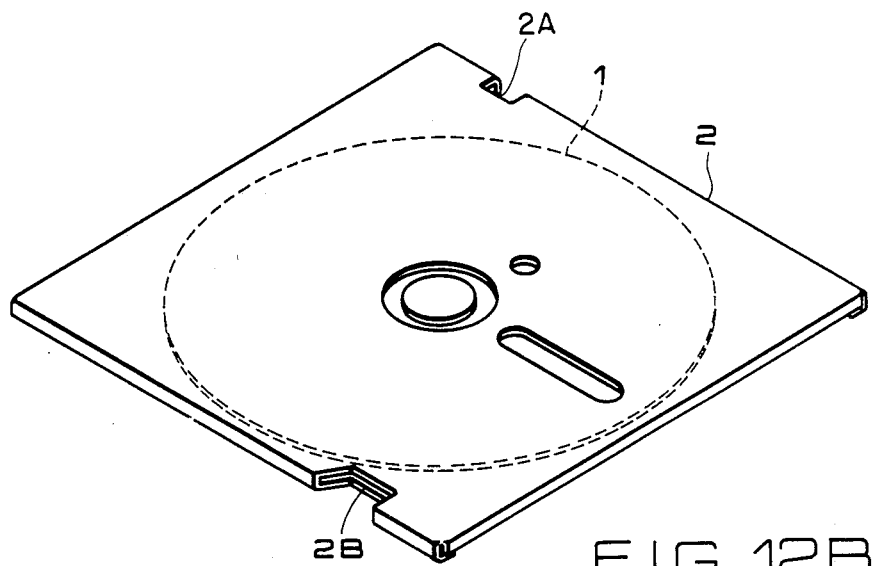
FIG. 12B is a jacket including a flexible disc medium for exclusive use for 96 TPI.

FIG. 12A is a perspective view of a whole jacket including a flexible disc medium of 48 TPI or 96 TPI in the prior art. The jacket in this state cannot discriminate 48 TPI or 96 TPI. FIG. 12B is a perspective view of a whole jacket including a flexible disc medium indicating the exclusive use for 96 TPI. Numeral 2B designates a notch to enable the designation of 96 TPI. The jacket without notch at a prescribed position is discriminated as 48 TPI; the jacket having a notch is discriminated as 96 TPI.

Figure 13A:
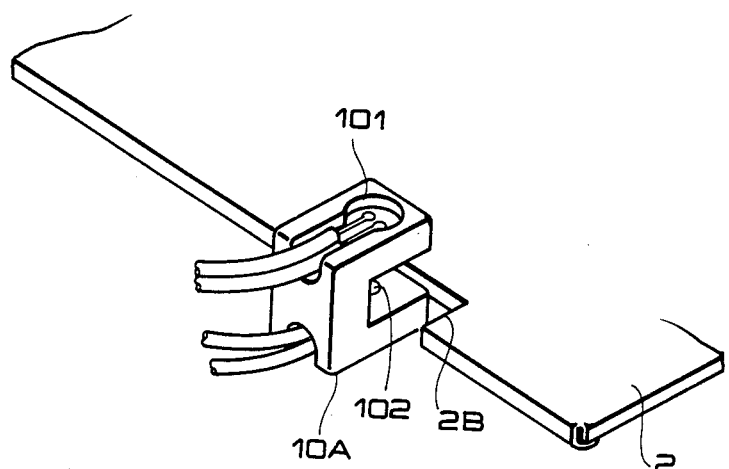
FIGS. 13A and 13B are perspective views showing the optical and mechanical means for detecting the notch shown in FIGS. 12A and 12B, respectively.
Figure 13B:
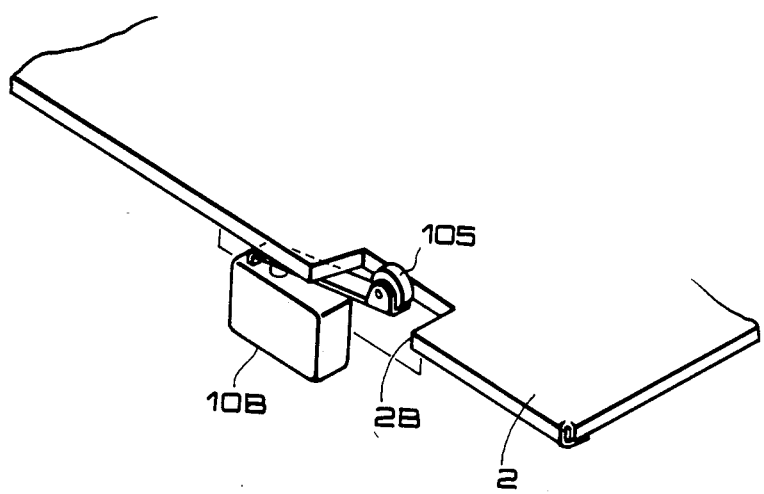

FIGS. 13A and 13B are schematic diagrams illustrating the optical and mechanical means for detecting the notch as shown in FIGS. 12A and 12B. In FIG. 13A, an optical medium discrimination detector 10A comprises a light emitting diode 101 and a light receiving element 102 formed in a pair. The jacket 2 is inserted in a prescribed position, so that the notch 2A of the jacket 2 is not disposed at a position between the light emitting diode and the light receiving element. In this constitution, the jacket as shown in FIG. 12A without notch 2B for 48 TPI blocks the light from the light emitting diode, and, therefore, the light receiving element does not respond. If the jacket has the notch 2B the light receiving element acts in response to the light from the light emitting diode and discriminates 96 TPI.

In FIG. 13B, a medium discrimination detector 10B comprises a microswitch. The jacket 2 is inserted in a prescribed position, so that the notch 2B is disposed in line with a sensor 105 of the medium discrimination detector 10B. In this constitution, the jacket as shown in FIG. 12A without notch 2B for 48 TPI pushes the sensor of the medium discrimination detector 10B comprising the microswitch, indicating that the jacket is for 48 TPI. If the jacket for 96 TPI, having the notch 2B, is now inserted, the sensor is not pushed and the sensor of the medium discrimination detector is not actuated, thereby indicating that the jacket is for 96 TPI.

What is claimed is:

1. A flexible disc device having a writing/reading magnetic head for reading and writing a flexible disc medium, said device comprising:
    (a) a spindle motor for rotating the disc medium at a prescribed constant rotating speed, the rotating speed of said spindle motor being determined by a spindle motor drive circuit;
    (b) magnetic head transfer means for moving the magnetic head so that the magnetic head is positioned with respect to any track of the flexible disc medium;
    (c) track density discrimination means for discriminating the track density of the flexible disc medium installed within the device body and providing a discrimination signal;
    (d) said magnetic head comprising a record regenerative head and erasing head cores placed at both sides of said record regenerative head, and being enabled to change effective erasing head track width at the recording state corresponding to the record density in the diameter direction of the flexible disc medium installed within the device; and
    (e) means for changing the effective erasing head track width, said changing means being driven corresponding to the discrimination signal from the track density discrimination means, thereby data compatibility in both directions of reading and writing by the magnetic head being given regarding at least two flexible disc media different in the track density.

2. A flexible disc device as set forth in claim 1, wherein said magnetic head is provided with a core having erasing head gaps at both sides of a core having said record regenerative head.

3. A flexible disc device as set forth in claim 2, wherein the cores having the erasing head gaps comprise two pairs of erasing head gaps, and the cores of said two pairs of erasing head gaps are provided with first and second erasing coils respectively.

4. A flexible disc device as set forth in claim 3, wherein said first and second erasing coils are supplied selectively with erasing current by the changing means corresponding to the discrimination signal, and the effective track width of the erasing head is changed.

5. A flexible disc device as set forth in claim 3, wherein said second erasing coil is wound on cores of two pairs of erasing head gaps.

6. A flexible disc device as set forth in claim 1, wherein said magnetic head transfer means is composed of a step motor, and the step motor is driven for positioning the magnetic head, and the pulse number of a step pulse input signal supplied to the step motor is increased in integral multiples by the discrimination signal from the track density discrimination means.

7. A flexible disc device as set forth in claim 6, wherein increase of the pulse number of step pulse input signal occurs when the track density of the flexible disc is low.

8. A flexible disc device as set forth in claim 1, wherein said track density discrimination means is constituted by a notch or a hole formed on a jacket of the flexible disc medium corresponding to the track density, and a detector is provided for detecting the notch or the hole optically or mechanically.

9. A flexible disc device as set forth in claim 1, wherein said track density discriminating means comprises means for reading the content of data already recorded on the flexible disc medium, and interpreting the content of data for deciding whether the reading is true or false.

10. A flexible disc device as set forth in claim 9, wherein said deciding means is executed by a host computer and the discrimination signal is sent out into the device.

11. A flexible disc device as set forth in claim 1, wherein the rotating speed of the spindle motor is changed corresponding to the discrimination signal from the track density discrimination means.

* * * * *

UNITED STATES PATENT AND TRADEMARK OFFICE
CERTIFICATE OF CORRECTION

PATENT NO. : 4,622,601

DATED : November 11, 1986

INVENTOR(S) : Shin Isozaki et al.

It is certified that error appears in the above-identified patent and that said Letters Patent is hereby corrected as shown below:

Column 1, line 49, after "of" insert --a-- and after "mistake" delete "a".

Column 3, line 43, delete "consisting of A-C".

Column 4, line 16, the word "as" should be --in--;
line 18, the word "in" should be --as--.

Column 5, line 1, "circit" should be --circuit--.

Column 6, line 8, "the" should be --that for--;
line 60, the word "no" should be --an--.

Column 7, line 41, the word "of" (second occurrence) should be --by--.

Signed and Sealed this

Thirty-first Day of March, 1987

*Attest:*

DONALD J. QUIGG

*Attesting Officer*  *Commissioner of Patents and Trademarks*